April 29, 1930.  G. RAMSEY  1,756,034
VACUUM TANK
Filed March 23, 1928  3 Sheets-Sheet 1

Inventor
George Ramsey

April 29, 1930. G. RAMSEY 1,756,034
VACUUM TANK
Filed March 23, 1928 3 Sheets-Sheet 2
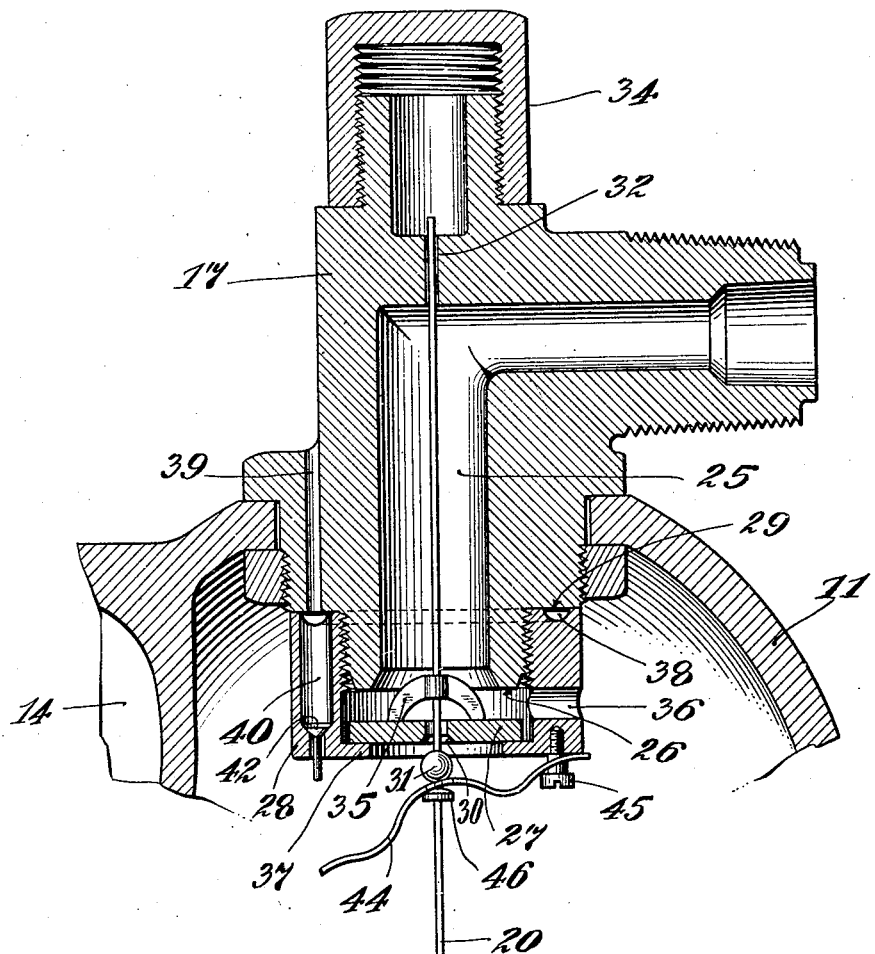
Fig.2.
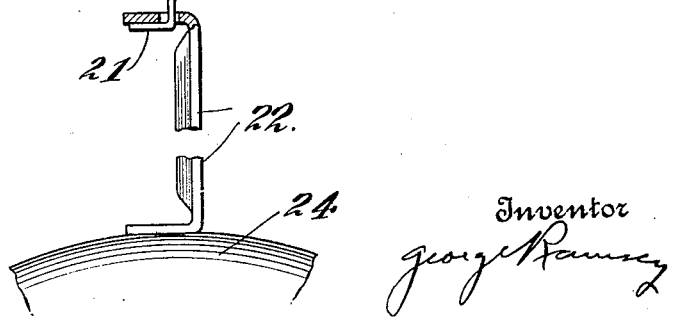
Inventor
George Ramsey April 29, 1930.  G. RAMSEY  1,756,034
VACUUM TANK
Filed March 23, 1928   3 Sheets-Sheet 3
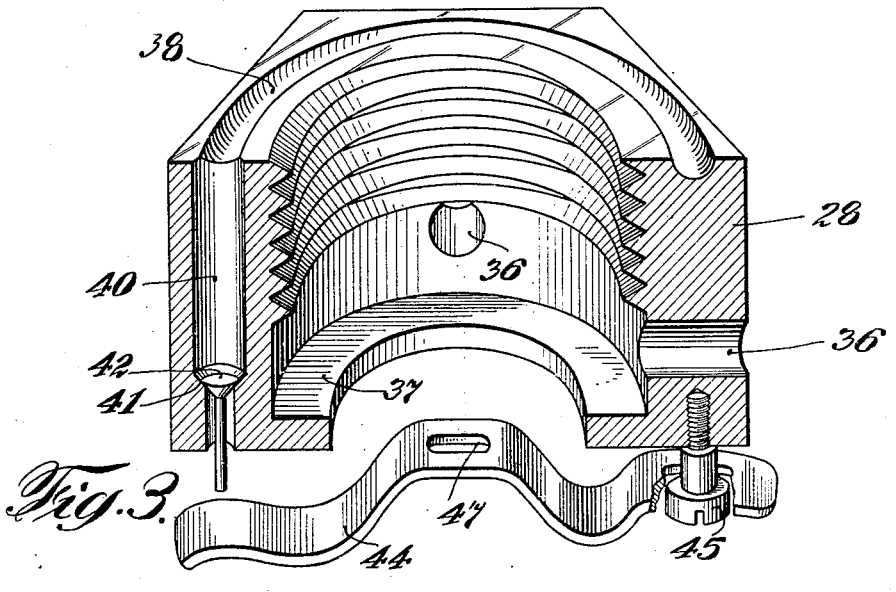
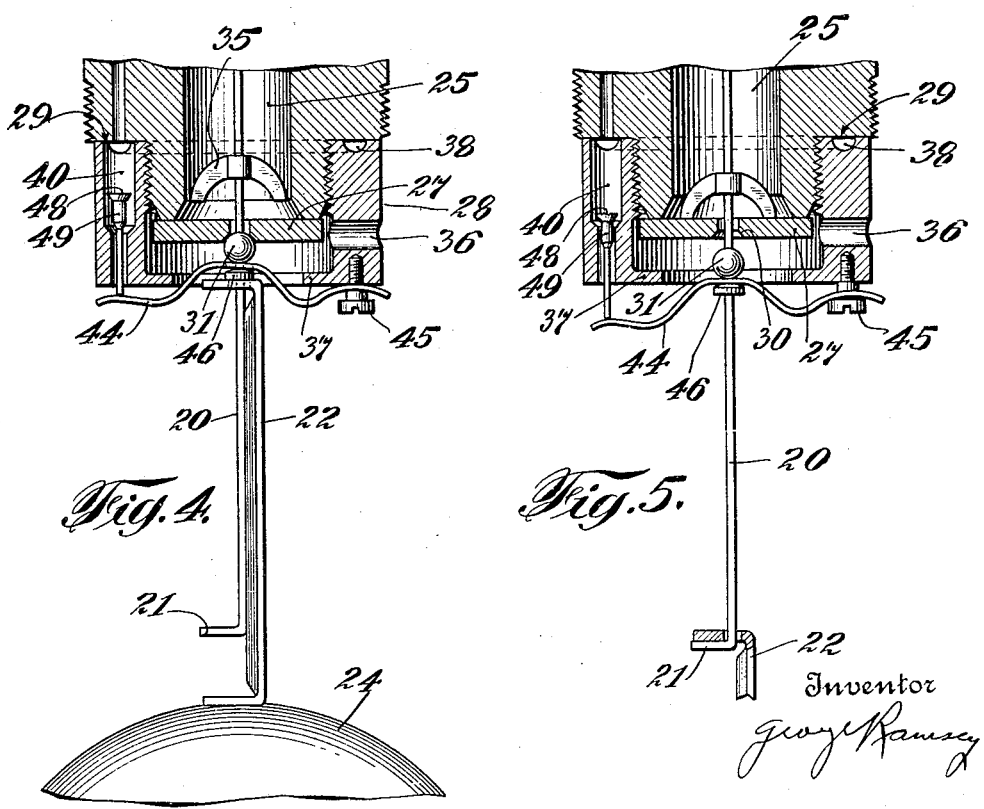
Inventor
George Ramsey Patented Apr. 29, 1930

1,756,034

UNITED STATES PATENT OFFICE

GEORGE RAMSEY, OF BROOKLYN, NEW YORK

VACUUM TANK

Application filed March 23, 1928. Serial No. 264,042.

The present invention relates to fuel feeding for hydrocarbon engines and more especially to vacuum tanks adapted for automobile use and the like.

The present invention relates more especially to a vacuum tank operating on the intermittently opened and closed system, whereby when the vacuum is effective to draw gasoline into the vacuum chamber, the vacuum chamber is sealed against atmospheric pressure and when the suction is cut off, the the vacuum chamber is opened to atmosphere to permit the gasoline to drain to a small storage tank.

The invention contemplates a construction which may operate as an open system part of the time and an intermittently open and closed system at other times. Where high suction is available to the vacuum tank, the invention contemplates also continued admission of a small amount of atmosphere to the vacuum tank. This prevents an undue surge of gasoline into the vacuum tank and at the same time permits the high suction valve to be of such size as to operate quickly and effectively to fill the vacuum tank. When the suction drops and low suction only is available, then the inflow of atmosphere is stopped when the low suction valve is opened, thereby securing the full effect of the low suction, and the tank operates at that moment as a closed system.

The present invention contemplates a simple structure without the use of springs, etc., which permits efficient operation of the vacuum tank under greatly varying conditions of suction, such as are normally encountered with automobiles when travelling through mountainous or hilly country. When an automobile is pulling a heavy load with the throttle wide open and the vacuum tank suction is obtained from a manifold (as is the usual custom) only very low suction is available. Under these conditions, it is desirable that all suction possible shall be available to draw gasoline from the supply tank. The main supply tank is usually located at the rear of the car and the lowest vacuum conditions are usually obtained when the car is climbing a very steep grade which means a maximum lift of gasoline. To this end, it is particularly desirable under these conditions that the vacuum tank shall be closed to atmosphere, whereby the maximum amount of vacuum is available to draw the gasoline to the vacuum tank. Under conditions where the engine is running at fair speed with a substantially closed throttle, the vacuum is high and such condition may occur when the car is travelling down grade, thereby raising the rear main tank relative to the vacuum tank and the high suction available tends to flood the vacuum chamber. Under these conditions, it may be desirable to admit a small amount of atmosphere when the high suction valve only is open. The vacuum tank comprising the present invention is therefore designed to take care of the limiting conditions and all intermediate stages.

It is realized that the present invention may be embodied in constructions other than those herein specifically illustrated and therefore, the disclosure herewith is to be considered as illustrative and not in the limiting sense.

Other and further objects of the present invention will in part be obvious and will in part be pointed out hereinafter in the specification following by reference to the accompanying drawings forming a part hereof, throughout which like parts are indicated by like characters throughout the several figures.

Fig. 2 is a detail view showing a preferred form of a portion of the device in section.

Fig. 3 is a detail view of one of the parts ready for assembly and showing a portion thereof in section.

Fig. 4 illustrates in section a detail of another form of the invention, wherein the atmospheric valve is constructed to admit a small volume of air when the high suction valve is open, and to completely close under low suction and show the high suction valve in closed position.

Fig. 5 illustrates in section the same mechanism as is shown in Fig. 4 with the high suction valve open and the low suction valve closed, and illustrates the admission of a small amount of atmosphere when the high suction valve is opened.

Figure 1:
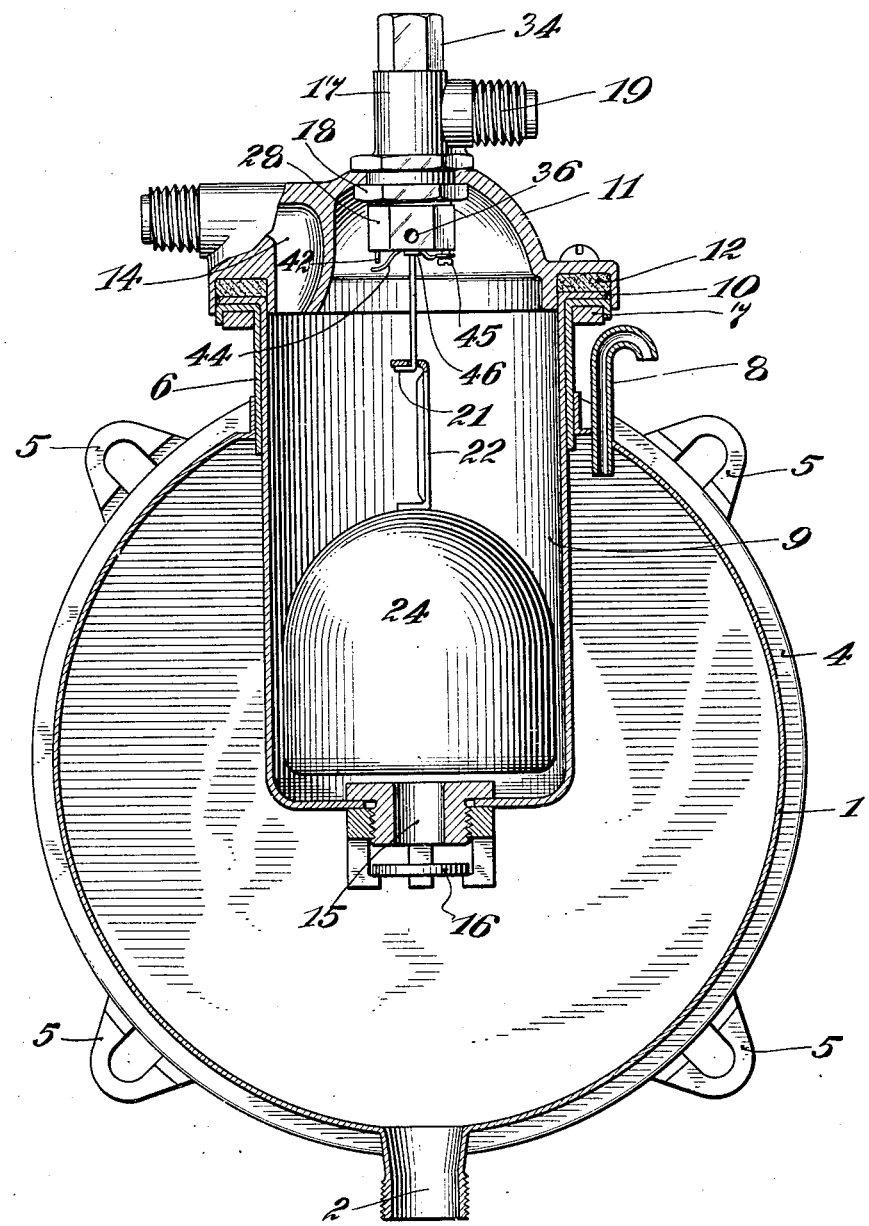
Fig. 1 is a sectional view illustrating a vacuum tank in accordance with the present invention.

Referring now to the drawings which illustrate preferred forms of the invention, and more especially to Fig. 1, a receiving or small storage tank 1 is provided with outlet 2 adapted to be connected by suitable piping with a carburetor of a hydrocarbon engine (not shown) and the flange 4 on the back of this tank is provided with fastening lugs 5. The upper portion of this tank 1 is provided with a cylindrical neck 6 having an upper flange 7. A vent 8 is also provided in the upper portion of the tank 1 and is open to atmosphere at all times in order that the gasoline in this tank may freely flow to a carburetor located at a lower level.

A vacuum tank 9 is provided with an upper flange 10 adapted to rest upon the upper flange 7 of the receiving tank and is closed by a head 11 which carries a gasket 12 that seals the joint between the head and the flange 10 of the vacuum tank 9. This head is provided with an inlet opening 14 adapted to be connected by suitable piping to the main storage tank of an automobile (not shown), whereby gasoline may be drawn into the vacuum chamber when suction is effective in this chamber. This vacuum tank 9 is also provided with an outlet opening 15 having a light disc valve 16 adapted to close the outlet opening when suction is effective in the vacuum chamber and is adapted to open to discharge gasoline in the storage tank 1 when suction is cut off from the suction chamber.

A valve fitting 17 is mounted in the head 11 by means of a suitable clamp nut 18. This valve fitting 17 is an entity comprising a suction connection 19, which in practice is usually connected with the manifold of an automobile engine (not shown), in such manner as to permit the suction in the said manifold to be effective for operating the device. This valve fitting 17 also carries suction valve mechanism comprising a stem 20 which is provided with a hook 21 at its lower end and which has a sliding connection with a member 22 that is secured by welding or otherwise to the upper portion of a float 24, whereby the rising and falling of the float as the gasoline in the vacuum chamber rises and falls in the operation of the device, closes and opens the suction valves.

Reference is now made more especially to Fig. 2, which illustrates in detail a section through the valve fitting 17. This valve fitting 17 is provided with a suction conduit 25 which terminates at the lower end in a valve seat 26, against which a large disc low suction valve 27 is adapted to seat. This low suction valve 27 is retained in operative relation to the valve seat by means of a large nut 28 that sets against a shoulder 29 on the valve fitting 17. The low suction valve 27 is provided with a high suction valve seat 30 against which a high suction valve 31 is adapted to set. This high suction valve 31 is carried on the valve stem 20 which valve stem extends upwardly through a guide 32 formed in the fitting 17 and the upper end of this fitting is sealed by a cap nut 34. A bridge or spider 35 is secured on the valve stem 20 above the low suction valve 27 so that this spider 35 prevents the high suction valve 31 from being displaced when this valve is opened. The spider also forms a suspension member which supports the weight of the float when in its lowest position hanging from hook 21. If the suction is low in the system at this time, the low suction valve 27 will be pulled away from the seat 26 by the weight of the float 24. If, on the other hand, suction is high so that the total pressure beneath the low suction valve 27 is greater than the weight of the float 24, the low suction valve 27 will not open, but the high suction valve 31 will open. The large nut 28 is provided with openings 36, through which air may be drawn from the vacuum tank when the low suction valve 27 drops against the ledge 37 on the large nut 28.

This large nut 28 is provided on its upper surface with an annular groove 38 (Fig. 3) which is adapted to cooperate with a vent opening 39, which leads through the fitting 17 and is open to atmosphere. A relatively large valve opening 40 is provided in the nut 28 and terminates at its lower end in a valve seat 41. This valve opening also communicates with the annular groove 38 so that when the nut 28 is set against the shoulder 29, the groove 38 at all times provides free communication between the valve opening 40 and the vent opening 39. A stemmed vent valve 42 is loosely mounted in the valve opening 40 and is adapted to seat against the valve seat 41. A vent valve operating lever 44 is pivoted on the nut 28 by pivot screw 45, and is adapted to be carried upward by the stop 46 on the stem 20 and contact with the stem of the vent valve 42, when the high suction valve 31 is closed. The lever arm 44 is provided with a relatively large opening 47 so that there is no danger of binding between the lever arm and the stem 20 of the high suction valve.

In this form of the device, it will be observed that when the suction valves are closed, the vent valve 42 is opened and atmosphere flows in through the vent openings 39, the groove 38 through the valve opening 40 into the vacuum tank. This immediately breaks the partial vacuum that has been produced in the tank and permits gasoline in the tank to freely flow through the disc valve 16 into the receiving tank 1. Furthermore, this admission of air in the vacuum tank adds to the pressure tending to hold up the suction valves. It furthermore permits a quick emptying of the vacuum tank so that the float 24 may quickly descend. As soon as the high suction valve is opened, the lever 44 drops away from the stem of the vent valve 42 so that this valve closes and the inflow of atmosphere is immediately stopped, and suction is again available to quickly draw up gasoline from the main storage tank (not shown) to the supply tank 1. This construction therefore facilitates the quick, positive action of the device, which is especially desirable under conditions of low suction. Furthermore, the construction is such that the entire mechanism of the suction operating devices may be mounted as an entity on the valve fitting 17 and thereby quickly and easily assembled during the manufacture of the tank.

Figs. 4 and 5 disclose slight modifications of the invention in that a modified vent valve 48 is provided with a cylindrical portion 49 beneath the valve head 48, and the stem of the valve is slightly longer than in the previous form illustrated in Figs. 2 and 3. In the modified form shown in Figs. 4 and 5, under conditions of high suction when the high suction valve 31 alone opens, the modified vent valve 48 drops to such position that the cylindrical portion thereof 49 restricts the inlet of atmospheric pressure, but does not entirely close the same. This permits a restricted inflow of atmospheric pressure which tends to reduce the high suction produced in the vacuum chamber and prevents a sudden surge or overflow of gasoline that would otherwise have been drawn in the vacuum tank if high suction were permitted to be fully effective. When both the low suction valve 27 and the high suction valve 31 open, then the head 48 of the modified vent valve drops against the seat 41 and completely closes this valve against the inflow of atmospheric pressure, so that under low suction all available suction in the suction line is effective in the vacuum chamber to draw up gasoline from the main storage tank at the rear of the automobile. This modified form renders the device more flexible under varying operating conditions and renders the vacuum tank available for use with hydrocarbon engines wherein there is a high variation in suction conditions in the manifold.

Having thus described my invention, what I claim is:

1. A vacuum tank for hydrocarbon engines comprising a receiving tank, a vacuum tank a cover for said vacuum tank, a fitting centrally located on said cover, a suction conduit in said fitting and leading to said vacuum tank, a suction control valve carried by said fitting and operable to open and close said conduit relative to said vacuum tank, means carried by said fitting for operating said suction control valve, a vent valve in said fitting for controlling a conduit from said vacuum tank leading to atmosphere, and a lever carried by said fitting and operated by said means to open said vent valve when said vacuum control valve is closed.

2. A vacuum tank for hydrocarbon engines comprising a receiving tank, a vacuum tank adapted to discharge into said receiving tank, a closure for said vacuum tank, a fitting carried by said closure and comprising a suction conduit, said fitting being provided with a shoulder on its lower portion, a nut adapted to seat against said shoulder, a suction control valve supported by said nut, said nut being provided with an atmospheric vent opening, a vent valve within said opening, and means carried by said nut and adapted to open said vent valve when said suction control valve is closed.

3. A valve fitting for vacuum tanks comprising a suction conduit, said fitting being provided with a shoulder on its lower portion, and having a vent opening leading to said shoulder, a suction control valve for controlling said suction conduit, a nut adapted to set against said shoulder, said nut being provided with a groove in the portion adapted to set against said shoulder and with said groove communicating with said vent, said nut being provided with a valve opening leading from said groove and having a valve seat, a vent valve for controlling said opening, and means carried by said nut and operable to open said vent valve when said control valve is closed.

4. A vacuum tank for hydrocarbon engines comprising a receiving tank, a vacuum tank, a member provided with a suction conduit leading to said vacuum tank, a pair of valves for controlling said suction conduit, an atmospheric vent valve, and means to partially open said vent valve when one of said suction control valves is closed and to completely open said atmospheric vent valve when both of said control valves are closed.

5. A vacuum tank for hydrocarbon engines comprising a receiving tank, a vacuum tank, a member provided with a suction conduit leading to said vacuum tank, a low suction valve and a high suction valve both controlling said suction conduit, an atmospheric vent valve, and means to partially close said vent valve when the high suction valve is open, and to completely close said atmospheric vent valve when both of said control valves are open.

6. A vacuum tank for feeding fuel to hydrocarbon engines comprising a receiving tank, a vacuum tank, a fitting provided with a suction conduit leading to said vacuum tank and also a vent opening leading to said tank, a pair of control valves for controlling said suction conduit, an atmospheric vent valve comprising a valve head and a restricting body, and means to render said restricting body effective to restrict said vent opening when one of said control valves is open and to permit said vent valve to seat when both of said control valves are open.

7. In a vacuum tank for hydrocarbon engines, a suction conduit, a plurality of suction control valves for controlling said suction conduit, an air vent valve, and float means to operate said plurality of suction control valves and said air vent valve.

GEORGE RAMSEY.